United States Patent [19]

Adl

[11] Patent Number: 4,834,479

[45] Date of Patent: May 30, 1989

[54] HIGH AND LOW PRESSURE FLUIDBLOCK ASSEMBLY

[75] Inventor: Ali Adl, Freehold Township, Monmouth County, N.J.

[73] Assignees: American Telephone and Telegraph Company, New York, N.Y.; AT&T Bell Laboratories, Murray Hill, N.J.

[21] Appl. No.: 940,726

[22] Filed: Dec. 11, 1986

[51] Int. Cl.[4] .................................. G02B 6/36
[52] U.S. Cl. .................... 350/96.2; 350/96.23
[58] Field of Search ............... 350/96.2, 96.23; 174/70 S

[56] References Cited

U.S. PATENT DOCUMENTS

| | | | |
|---|---|---|---|
| 4,214,809 | 7/1980 | Reh | 174/70 SX |
| 4,345,816 | 8/1982 | Nakai et al. | 174/705 X |
| 4,385,797 | 5/1983 | Dubois et al. | 350/96.2 |

OTHER PUBLICATIONS

AT&T Technologies, *Technical Digest*, No. 73, Jan. 1984, pp. 1-2, Backus et al.

Primary Examiner—John D. Lee
Assistant Examiner—John Ngo
Attorney, Agent, or Firm—Richard B. Havill

[57] ABSTRACT

A fluidblock/waterblock assembly for an undersea optical fiber cable includes a socket with a cavity. A rubber plug, shaped to fit into the cavity, is pierced with one or more holes for inserting an optical fiber or fibers. The rubber plug holding the fibers in the cavity is preloaded with an internal compressive stress which assures no leakage of fluid around or through the rubber plug throughout a range of external pressures ranging from zero to ocean bottom pressure and applied to the rubber plug.

11 Claims, 2 Drawing Sheets

HIGH AND LOW PRESSURE FLUIDBLOCK ASSEMBLY

BACKGROUND OF THE INVENTION

This invention relates to a fluidblock assembly which may be described more particularly as a fluidblock assembly for blocking flow of liquid and gas at pressures ranging from very low pressures to very high ocean floor pressures.

In the prior art, waterblock assemblies have not been used for preventing water leaks from penetrating from a paired-wire or a coaxial undersea cable into very expensive electronic repeater equipment which is housed in an otherwise watertight pressure vessel. Seals were sufficient to prevent penetration of water into the vessel.

Recently optical fiber cable has been recognized as a viable alternative for paired-wire and coaxial cable undersea transmission systems. A waterblocking device is essential for an optical fiber undersea cable. In case of a break in the sheath of an optical fiber cable, water should be blocked from traveling into the expensive electronic repeater equipment.

Because of optical fibers are somewhat fragile and have very different physical characteristics than metallic conductors, problems arise in designing a waterblock assembly for optical fibers used in an undersea cable system.

SUMMARY OF THE INVENTION

These problems are solved by a fluidblock/waterblock assembly for an undersea optical fiber cable that includes a socket with a cavity. A rubber plug, shaped to fit into the cavity, is pierced with one or more holes for inserting an optical fiber or fibers. The rubber plug holding the fibers in the cavity is preloaded with an internal compressive stress which assures no leakage of fluid around or through the rubber plug throughout a range of external pressures ranging from zero to ocean bottom pressure and applied to the rubber plug.

BRIEF DESCRIPTION OF THE DRAWING

A better understanding of the invention can be derived by reading the following detailed description with reference to the appended drawing wherein.

DETAILED DESCRIPTION

Figure 1:
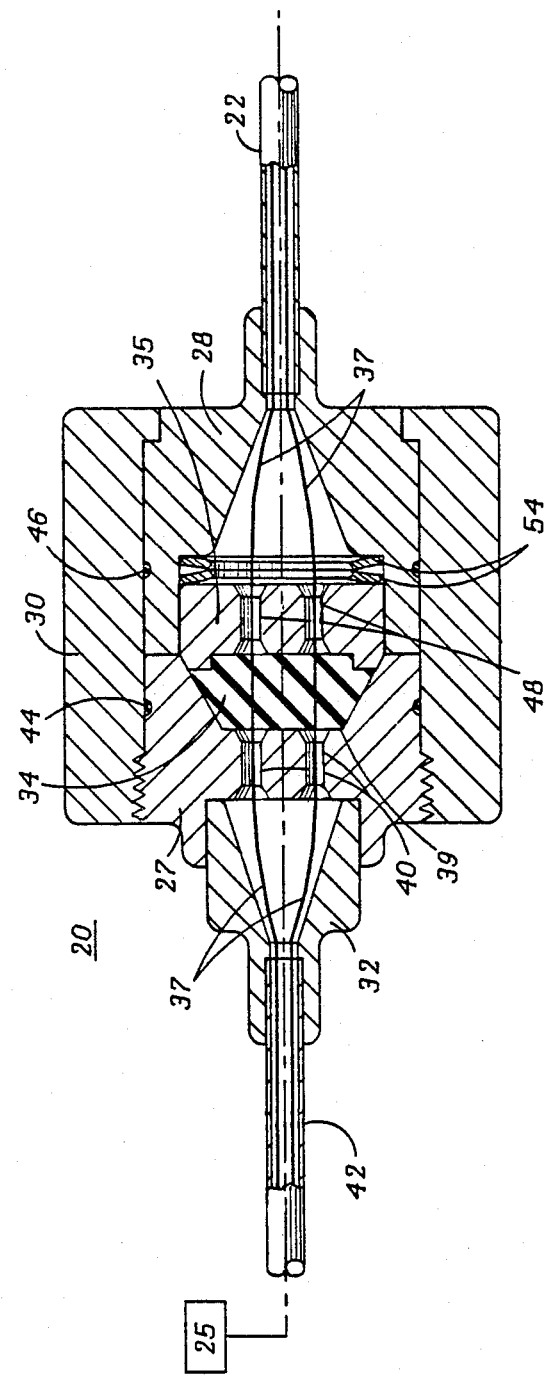
FIG. 1 is a cross-section of an optical fiber fluidblock assembly.

Referring now to FIG. 1, a high pressure fluidblock/waterblock assembly 20 for an undersea optical fiber cable 22 includes several parts which, when assembled, prevent gas and fluids at low and high pressures, such as atmospheric pressure and ocean bottom pressure, from seeping from the interior of the cable 22 to a repeater housing and electronic repeater equipment, shown illustratively as a block 25. The waterblock assembly further includes a body, or socket, 27, a pig tail adapter 28, a retainer sleeve 30, an internally tapered cavity part 32, a rubber plug 34, a keyed bushing 35, optical fibers 37, and spring washers 54.

Because of anticipated exposure to sea water, the socket 27, the pig tail adapter 28, the retainer sleeve 30, and the tapered cavity part 32 are made of beryllium copper. This material provides good strength and machinability for cutting threads and close tolerance surfaces as well as good sea water corrosion resistance. For other applications any metal or other material strong enough to withstand the applied forces will be suitable.

The body, or socket, 27 is a piece which has a substantially cylindrical exterior surface. Threads are cut into a raised portion of the exterior surface. A groove, having a semicircular cross-section, is cut into the straight portion of the exterior surface as a ring around the socket.

At the left-hand end of the socket 27 there is an extended round collar that surrounds a cylindrically-shaped opening. At the right-hand end of the socket 27 there is a truncated conically-shaped cavity. The base of the conically-shaped cavity is at the right-hand end of the socket which also is the sea water pressure side of the fluidblock/waterblock assembly. The truncated end of the conically-shaped cavity forms a stop, or barrier, wall 39 in the center of the socket. Holes 40 are drilled through the retaining wall 39 and the rest of the body of the socket 27 to the cylindrically-shaped opening at the left-hand end of the socket. Each of the holes 40 provides a passage for a single optical fiber in the completed fluidblock/waterblock assembly 20. The holes 40 are wide enough to accommodate small hollow tubes used during fabrication for facilitating insertion of the optical fibers 37 through the assembly 20. The fabrication procedure is to be described subsequently herein.

Ends of the holes 40 can be beveled, as shown in FIG. 1. Such beveling helps ease the hollow tubes into the water blocking assembly during fabrication.

The right-hand end of the socket 27 has a flat ring-shaped surface surrounding the base of the conical opening. This ring-shaped surface, oriented perpendicular to the center axis of the assembly 20, is machined smooth to seat snugly against a similar surface on the left-hand end of the pig tail adapter 28.

Pig tail adapter 28 is a piece also having a substantially cylindrical external shape. There are three different external sections of the pig tail adapter. They have different diameters. The largest diameter, which is equivalent to the smooth outside diameter of the socket, is at the left-hand end of the pig tail adapter. A semicircular groove is cut into the largest diameter exterior surface of the pig tail adapter. A shoulder surface is formed by reducing the outside diameter to an intermediate dimension. The shoulder includes a flat ring surface which is perpendicular to the center axis of the assembly 20 and is machined smooth for seating against a collar formed on the inside of the retainer sleeve 30. A second reduction of the outside diameter is taken to form a collar which extends to the right-hand end of the pig tail adapter for surrounding the end of the cable 22. Another flat ring surface is machined on the left-hand end of the pig tail adapter to seat against the right-hand end of the socket 27.

Inside, the pig tail adapter 28 also has three sections. The left-hand inside section is a straight cylindrical cavity having a diameter that is as large as or larger than the diameter of the base of the conical cavity in the socket 27. This cylindrical cavity section is long enough to accommodate the keyed bushing 35 and some spring washers 54. The center inside section of the pig tail adapter 28 is a conically-shaped cavity that is dimensioned for spreading out optical fibers from the cable core of the cable 22 to holes 48 in the keyed bushing 35, which holes are aligned with the holes 40 in the socket 27. The right-hand end of the interior section of the pig tail adapter is a cylindrically-shaped cavity dimensioned to receive and connect with the end of the cable 22.

The socket 27 and the pig tail adapter 28 are held snugly together by the retainer sleeve 30. The retainer sleeve 30 is a generally cylindrically shaped piece. The interior surface of the retainer sleeve has threads cut near the left-hand end for engaging the threads on the exterior surface of the socket 27. The center portion of the interior is a flat cylindrical surface. At the right-hand end of the retainer sleeve, a collar is formed with a smooth flat ring surface machined on the inside in a position that is perpendicular to the center axis of the assembly 20. That ring surface is designed to seat snugly against the flat ring surface on the shoulder of the pig tail adapter 28.

Inside of the pig tail adapter 28, there is a shoulder which presses against the spring washers 54 when the retainer sleeve 30 is screwed into place. The spring washers 54 in turn press on the keyed bushing and rubber plug, thereby imparting a preload compressive stress into the rubber plug 34.

Two rubber O-rings 44 and 46 are inserted into the assembly 20. The material selection of the O-rings is based upon the maximum pressure to be applied during use and the temperature range anticipated during manufacture and use. One O-ring 44 is located between the retainer sleeve 30 and the socket 27. The other O-ring 46 is inserted between the retainer sleeve 30 and the pig tail adapter 28. Each of these O-rings 44 and 46 is placed in one of the semicircular cross-section rings cut into the exterior surfaces, respectively, of the socket 27 and the pig tail adapter 28.

The internally tapered cavity part 32 has a tapered cavity at its interior right-hand end. This tapered cavity accommodates closing the fibers 37 back together into a jacket 42 for routing to the repeater electronics 25. The left-hand end of the interior of the part 32 is a cylindrical opening dimensioned to receive the routing jacket 42 through which the fibers pass. The routing jacket connects the tapered cavity part 32 with the repeater housing and the repeater equipment 25.

Water and gas blocking is accomplished in part by the O-ring seals placed outside of the socket 27 and the pig tail adapter 28. Those O-rings 44 and 46 are compressed sufficiently by the cylindrical inner wall of the retainer sleeve 30 to prevent any seepage of water or gas at either low or high pressure. Additional important water and gas blocking is achieved by the plug 34.

Plug 34 is a truncated conically-shaped piece made of rubber which behaves like a compressible fluid when placed under compressive pressure. The plug 34 is shaped to fit into the cavity of the socket 27. For low pressure applications, almost any rubber product will work. For high pressure applications, chlorobutyl has been very advantageous. Forces, applied to the rubber plug, are converted to internal pressure which is distributed equally throughout. Pressure from preloading is distributed and exerted equally upon the fibers 37, which are inserted through the rubber plug, and upon the socket walls. Hydrostatic pressure from sea water likewise is distributed throughout the plug 34 and is exerted equally upon the fibers 37 and the cavity walls of the socket 27. Total internal pressure is a summation of the preload pressure and the hydrostatic pressure. This total internal pressure always exceeds the hydrostatic pressure and thus prevents sea water from penetrating through the waterblock assembly 20 either between the plug 34 and fibers 37 or between the plug and cavity walls of the socket 27.

Figure 2:
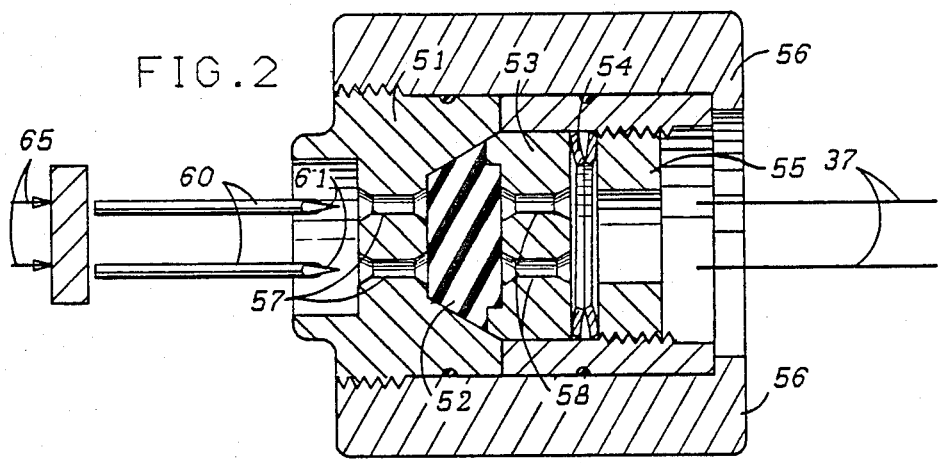
FIG. 2 is a cross-sectional view of the fluidblock assembly during manufacture.
Figure 3:
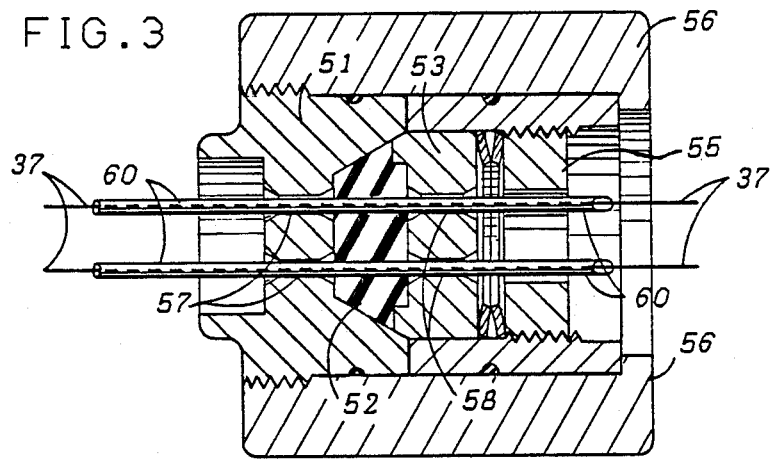
FIG. 3 is another cross-sectional view of the fluidblock assembly during manufacture.
Figure 4:
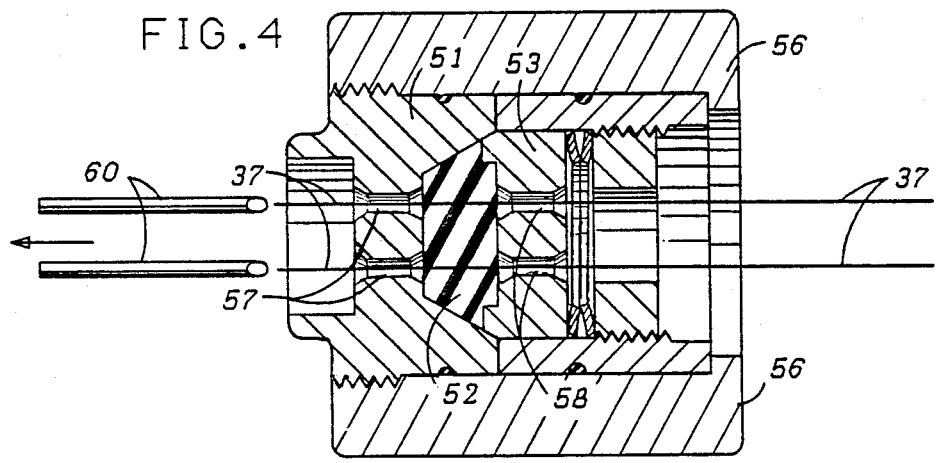
FIG. 4 is a further cross-sectional view of the fluidblock assembly during manufacture.

With reference to FIGS. 2, 3 and 4, the assembly process is discussed. The assembly process proceeds through several steps.

In FIG. 2 an illustrative socket 51 contains a truncated conically-shaped rubber plug 52. A keyed bushing 53, spring washers 54, a nut 55, and a retainer ring 56 hold the rubber plug 52 in the socket. Alignment holes 57 and 58, equal in number to the number of fibers in the cable, are open through the barrier wall of the socket 51 and through the bushing 53. The holes 57 and 58 in the socket and the bushing are aligned axially with one another.

Hollow hypodermic tubes 60 also are aligned axially with the holes 57 and 58. The tubes are filled with sharpened solid fillers 61 before insertion into the plug 52. Then an insertion force 65 pushes on the hypodermic tubes 60 and fillers 61 while they enter the holes 57, pierce through the plug 52 and exit through the holes 58, as shown in FIG. 3. Because little or no material is removed from the plug when it is pierced, the fibers 37 fit snuggly within the plug.

Once the plug 52 is pierced and the tubes 60 protrude sufficiently, the fillers 61 are removed. Then the fibers 37 are slipped through the tubes 60.

As shown in FIG. 4, after the fibers are in place in each tube, the tubes 60 are withdrawn from the plug 52 and the assembly. This leaves the fibers inserted through the holes 57 and 58 in the socket 51 and bushing 53 and also through the pierced holes in the plug 52.

With the fibers 37 in place, the entire fluidblock-/waterblock assembly, in accordance with FIG. 1, can be assembled. The pig tail adapter 28 is positioned surrounding the keyed bushing 35 and spring washers 54 and is seated against the socket 27. O-rings 44 and 46 are put into the exterior grooves of the socket 27 and pig tail adapter 28. Then the threaded retainer sleeve 30 is put in place and screwed down until a preload force is exerted through the spring washers 54 and the bushing 35 to the base end of the rubber plug 34. The preload force imparts a preload compressive stress into the rubber plug 34.

Since internal pressure is exerted equally in all directions within the plug 34, that plug is pushed snugly against the stop, or barrier, wall 39, the sidewall of the socket cavity and the fibers 37. The rubber composition, the diameter of the fibers 37, the diameter of the holes 40 and 48, and the maximum expected hydrostatic pressure are selected so that the rubber plug 34 does not extrude through any of the holes 40 or 48. The preload compressive stress in the rubber plug 34 seals the plug tightly against the fibers and the socket walls.

The preload compressive stress in the plug is sufficient to prevent any gas or liquid seepage through or around the plug 34 either above the surface of the water or under water while the cable is not damaged. When the waterblock assembly is immersed in the ocean and water leaks into the cable, the preload compressive stress always is added to the surrounding hydrostatic pressure of the water to determine the total internal pressure exerted within the rubber plug 34. The surrounding hydrostatic pressure is transferred through the cable 22 and the bushing 35 to the base end of the rubber plug 34 where the hydrostatic pressure is added to the preload stress. There is sufficient total internal pressure within the plug 34 to prevent water from seeping by either the plug 34 or fibers 37 at any time. Thus, at all times the fluidblock/waterblock assembly prevents both gas and water seepage from the cable 22 into the electronic equipment 25 where it will cause damage.

Other shapes, such as a full conical shape, tapered shapes, and a cylindrical shape, of the plug and cavity can be used. The plug and cavity, however, should be similar shapes.

It is noted that the seal is effective without resorting to specially treating the surface of the fibers 37 with metallization or epoxy compounds. Sealing out the gas and water without resorting to the metallization or epoxy is very advantageous because those materials are difficult to apply to the optical fibers and are subject to failure during use.

The foregoing represents an illustrative embodiment of the invention and a method of practicing the invention. This embodiment and others which are obvious in view thereof are considered to be within the scope of the appended claims.

What is claimed is:

1. A fluidblock assembly comprising
   a socket including a truncated conically-shaped cavity having an open base at one end and a barrier wall at the opposite end with at least one hole cut through the barrier wall;
   a truncated conically-shaped rubber plug matching the shape of the cavity and fitting into the cavity with the truncated end of the plug adjacent to the barrier wall and with at least one optical fiber size opening pierced through the rubber plug from its truncated end to its base;
   an optical fiber passing through both the opening in the plug and the hole in the barrier wall;
   the rubber plug being preloaded with a preload compressive stress exerting substantially equal pressures on the sidewall and barrier wall of the cavity and on the optical fiber; and
   the preload compressive stress, applied to the rubber plug, blocks fluid under pressure from passing from the base end of the cavity in the socket to the barrier wall throughout a range of fluid pressures ranging from zero to ocean bottom pressure.

2. A fluidblock assembly, in accordance with claim 1, wherein the rubber plug is fabricated in a chlorobutyl material.

3. A fluidblock assembly, in accordance with claim 1, wherein the preload compressive stress is created and maintained by permanently pushing the rubber plug against the side wall and the barrier wall of the cavity in the socket.

4. A liquidblock assembly comprising
   a socket including a truncated conically-shaped cavity having an open base at one end and a barrier wall at the opposite end with at least one hole cut through the barrier wall;
   a truncated conically-shaped rubber plug matching the shape of the cavity and fitting into the cavity with the truncated end of the plug adjacent to the barrier wall and with at least one optical fiber size opening pierced through the rubber plug from its truncated end to its base;
   an optical fiber passing through both the opening in the plug and the hole in the barrier wall;
   the rubber plug being preloaded with a preload compressive stress exerting substantially equal pressures on the sidewall and the barrier wall of the cavity and on the optical fiber; and
   the preload compressive stress, applied to the base of the rubber plug, blocks liquid under pressure from passing from the base end of the cavity in the socket to the barrier wall for liquid pressures up to ocean bottom pressure.

5. A gasblock assembly comprising;
   a socket including a truncated conically-shaped cavity having an open base at one end and a stop wall at the opposite end with at least one hole cut through the stop wall;
   a truncated conically-shaped rubber plug matching the shape of the cavity and fitting into the cavity with the truncated end of the plug adjacent to the stop wall and with at least one optical fiber size opening pierced through the rubber plug from its truncated end to its base;
   an optical fiber passing through both the opening in the plug and the hole in the stop wall;
   the rubber plug being preloaded with a preload compressive stress exerting substantially equal pressure on the side wall and the stop wall of the cavity and on the optical fiber; and
   the preload compressive stress, applied to the rubber plug, blocks gas under pressure from passing from the base end of the cavity in the socket to the stop wall for gas pressures up to ocean bottom pressure.

6. A method of assemblying a fluidblock assembly comprising the steps of:
   a. inserting a rubber plug into a cavity in a socket;
   b. holding the rubber plug in place;
   c. piercing one or more holes through the rubber plug with a holow tube or tubes;
   d. passing a separate optical fiber through each tube;
   e. withdrawing the tube or tubes from the rubber plug while leaving the optical fiber or fibers inserted through the rubber plug; and
   f. preloading the rubber plug with a force that imparts a preload compressive stress into the rubber plug.

7. A fluidblock assembly comprising
   a socket including a cavity having an opening at one end and a barrier wall at the opposite end with at least one hole cut through the barrier wall;
   a rubber plug matching the shape of the cavity and fitting into the cavity with at least one optical fiber size opening pierced through the rubber plug;
   an optical fiber passing through both the opening in the plug and the hole in the barrier wall of the socket;
   the rubber plug being preloaded with a compressive stress exerting substantially equal pressures on the cavity and on the optical fiber; and
   the preload compressive stress, applied to the rubber plug, blocks fluid under pressure from passing from the opening of the cavity in the socket to the barrier wall of the cavity throughout the range of fluid pressures ranging from zero to ocean bottom pressure.

8. A fluidblock assembly, in accordance with claim 7, wherein the rubber plug is fabricated in a chlorobutyl material.

9. A fluidblock assembly, in accordance with claim 7, wherein
   the preload compressire stress is created and maintained by permanently pushing the rubber plug against the side wall and the barrier wall of the cavity in the socket.

10. An optical fiber cable transmission system comprising
   a repeater;
   a repeater housing surrounding the repeater to protect it from pressure and fluid;
   a cable including at least one optical fiber for carrying optical signals, the cable being capable of conducting a fluid; and
   a fluidblock device through which the fiber passes, connected between the cable and the repeater housing, for blocking any fluid under pressure, which enters the cable, from leaving the cable and entering the repeater housing at any fluid pressure throughout a range from atmospheric pressure to ocean bottom pressure, the fluidblock device further comprising:
   a socket including a cavity having an opening at one end with at least one hole cut through the barrier wall;
   a rubber plug matching the shape of the cavity and fitting into the cavity with at least one optical fiber size opening pierced through the rubber plug;
   the optical fiber from the cable passing through both the opening in the plug and the hole in the barrier wall of the socket;
   the rubber plug being preloaded with a compressive stress exerting substantially equal pressure on walls of the cavity and on the optical fiber; and
   the preload compressive stress being applied for blocking a fluid under pressure from passing from the cable through the cavity in the socket to the barrier wall of the cavity throughout a range of fluid pressures ranging from zero to ocean bottom pressure.

11. A method of assembling a fluidblock assembly comprising the steps of:
   a. holding a rubber plug;
   b. piercing one or more holes through the rubber plug with a hollow tube or tubes;
   c. passing a separate optical fiber through each tube;
   d. withdrawing the tube or tubes from the rubber plug while leaving the optical fiber or fibers inserted through the rubber plug; and
   e. preloading the rubber plug with a force that imparts a preload compressive stress into the rubber plug and against the optical fiber.

* * * * *